(12) United States Patent
He

(10) Patent No.: US 12,723,707 B2
(45) Date of Patent: Sep. 1, 2026

(54) MOVABLE COUNTERWEIGHT BASE ASSEMBLY FOR OUTDOOR SUNSHADE UMBRELLA

(71) Applicant: Zhejiang Qinda Travelling Products Co., Ltd., Zhejiang (CN)

(72) Inventor: Daqin He, Zhejiang (CN)

(73) Assignee: Zhejiang Qinda Travelling Products Co., Ltd., Zhejiang (CN)

( * ) Notice: Subject to any disclaimer, the term of this patent is extended or adjusted under 35 U.S.C. 154(b) by 66 days.

(21) Appl. No.: 19/033,501

(22) Filed: Jan. 22, 2025

(65) Prior Publication Data

US 2026/0210487 A1 Jul. 23, 2026

(51) Int. Cl.
*F16M 11/42* (2006.01)
*E04H 12/22* (2006.01)

(52) U.S. Cl.
CPC ......... *F16M 11/42* (2013.01); *E04H 12/2238* (2013.01); *F16M 2200/04* (2013.01); *F16M 2200/08* (2013.01)

(58) Field of Classification Search
CPC ................ F16M 11/42; F16M 2200/04; E04H 12/2238; A45B 25/02
USPC ............................................ 248/519; 135/16
See application file for complete search history.

(56) References Cited

U.S. PATENT DOCUMENTS 6,367,494 B1 * 4/2002 Tung ...................... E01F 9/662 135/48
8,632,045 B2 * 1/2014 Ma .......................... F16H 21/54 248/129
8,636,020 B2 * 1/2014 Li .......................... A45B 25/14 135/912
8,833,709 B2 * 9/2014 Weng ..................... A45B 23/00 248/129
10,017,955 B2 * 7/2018 Ye .......................... A45B 23/00
10,426,234 B1 * 10/2019 Volin ........................ E03B 3/03
10,508,465 B2 * 12/2019 Pan ..................... E04H 12/2246
11,365,557 B2 * 6/2022 Ma ...................... E04H 12/2238
12,000,165 B2 * 6/2024 Frerich ............... E04H 12/2269
12,225,989 B1 * 2/2025 Zhao ...................... A45B 17/00
2006/0103092 A1 * 5/2006 Strahler ................ B62B 5/0083 280/79.11
2007/0080277 A1 * 4/2007 Chen ................... E04H 12/2246 248/354.3
2025/0320957 A1 * 10/2025 Browne .............. E04H 12/2246

FOREIGN PATENT DOCUMENTS

CN 208564140 3/2019

* cited by examiner

*Primary Examiner* — Todd M Epps
(74) *Attorney, Agent, or Firm* — JCIPRNET

(57) ABSTRACT

Disclosed is a movable counterweight base assembly for an outdoor sunshade umbrella, including a counterweight base and a moving mechanism, where the moving mechanism can drive the counterweight base to move, a bottom of the counterweight base is provided with a mounting slot, and the mounting slot is configured to mount the moving mechanism in a fit manner; the moving mechanism includes a control portion and a driven portion, the control portion includes a control lever, a flip arm located at a lower part of the control lever and a first moving wheel set located at a lower part of the flip arm, a linkage rod is connected between the control portion and the driven portion, and the driven portion includes a flip seat, a flip shaft and second moving wheel sets located at both ends of the flip shaft.

16 Claims, 4 Drawing Sheets

MOVABLE COUNTERWEIGHT BASE ASSEMBLY FOR OUTDOOR SUNSHADE UMBRELLA

BACKGROUND

Technical Field

The present disclosure relates to the technical field of outdoor sunshade umbrellas, and in particular to a movable counterweight base assembly for an outdoor sunshade umbrella.

Description of Related Art

With continuous development of society, outdoor sunshade umbrellas capable of blocking sunlight and providing shade have been widely used in families, swimming pools, hotels, guesthouses and other entertainment and leisure places. The outdoor umbrellas are usually supported by a base, and a weight of the base is an important factor in firmly supporting an umbrella body. The base must have enough weight to support the heavy umbrella body. Therefore, the outdoor umbrellas are generally heavy and difficult to carry and move. If a user wants to adjust the position of the outdoor umbrella, it is time-consuming and laborious.

For this purpose, the Chinese Patent (Publication No. CN208564140U) discloses a sunshade umbrella and a base thereof. The base is configured to connect an umbrella post to support an umbrella top, and includes a support, a moving assembly and a counterweight; an upper side of the support is provided with a connecting piece for connecting the umbrella post; the moving assembly is configured to roll or slide to drive the support to move; and the support has a counterweight area for bearing the counterweight. When it is necessary to move the sunshade umbrella, it only needs to drive the moving assembly to roll or slide to move the support and the whole umbrella sunshade. Compared with the prior art, which requires several people to work together, the labor intensity of moving the sunshade umbrella is greatly reduced, and movement of the sunshade umbrella is more time-saving and labor-saving.

However, the moving assembly in the structure cannot be automatically retracted, and needs to be limited. Therefore, when the counterweight needs to be in a static state, operation is relatively troublesome, and especially when the outdoor umbrella is subject to big wind, the umbrella seat is easily driven to move, affecting stability.

SUMMARY

In view of the above problems, the present disclosure aims to provide a movable counterweight base assembly for an outdoor sunshade umbrella, which can realize autonomous switching between moving and stationary states, improving convenience of use.

In order to solve the above technical problems, the present disclosure adopts a technical solution as follows:

a movable counterweight base assembly for an outdoor sunshade umbrella includes a counterweight base and a moving mechanism, where the moving mechanism can drive the counterweight base to move, a bottom of the counterweight base is provided with a mounting slot, the mounting slot is configured to mount the moving mechanism in a fit manner; the moving mechanism includes a control portion and a driven portion, the control portion includes a control lever, a flip arm located at a lower part of the control lever and a first moving wheel set located at a lower part of the flip arm, a linkage rod is connected between the control portion and the driven portion, and the driven portion includes a flip seat, a flip shaft and second moving wheel sets located at both ends of the flip shaft; when the control lever moves, the control lever can drive the flip arm to flip, the flip arm drives the first moving wheel set to protrude downward from the mounting slot, the flip arm drives the linkage rod synchronously and further drives the flip seat to flip through the linkage rod, the flip seat drives the flip shaft to rotate, and the flip shaft drives the second moving wheel sets to protrude downward from the mounting slot, such that a bottom surface of the counterweight base is separated from the ground, and the first moving wheel set and the second moving wheel sets are in contact with the ground, thereby enabling a movement of the counterweight base.

The counterweight base is provided with a control cavity, the control lever passes through the control cavity and extends upward, and the control lever can be manipulated and moved along the control cavity.

The control cavity is shaped like a runway hole.

The counterweight base is provided with an umbrella post assembly cavity.

The counterweight base is circular or polygonal.

The mounting slot includes a first slot, a linkage shaft groove, a flip shaft groove and two second slots; the first slot is configured to match the first moving wheel set, the linkage shaft groove is configured to match the linkage rod, the flip shaft groove is configured to match the flip shaft, and the second slots are configured to match the second moving wheel sets correspondingly.

The first slot is provided with two first rolling shaft seats, the first rolling shaft seats are provided with first rolling shaft grooves, a rolling shaft is matched in the first rolling shaft grooves, and the rolling shaft is fixedly mounted on a lower end of the control lever.

The first rolling shaft grooves are provided with first mounting holes, and rolling shaft limit cover plates are fixed on the first mounting holes.

The first moving wheel set includes a first roller seat and a first universal roller located at a lower part of the first roller seat, one end of the flip arm is hinged with one end of the linkage rod, and the other end of the flip arm is fixedly matched with any one or more of the control lever, the first roller seat and the rolling shaft; and when the control lever moves, the flip arm flips with a hinge between the flip arm and the linkage rod as a pivot point, and both ends of the rolling shaft rotate along the first rolling shaft grooves respectively to realize overall rotation of the first moving wheel set.

The second slot is provided with at least one second rolling shaft seat, the second rolling shaft seat is provided with a second rolling shaft groove, the second rolling shaft groove is configured to match the flip shaft, the second rolling shaft seat is provided with second mounting holes, and second flip shaft cover plates are matched on the second mounting holes.

Each of the second moving wheel sets includes a second roller seat and a second universal roller located at a lower part of the second roller seat, the second moving wheel sets located at both ends and the first moving wheel set are arranged in an isosceles triangle, and the first moving wheel set is located at a vertex angle.

The flip shaft groove is provided with a third rolling shaft seat, the third rolling shaft seat is provided with a third rolling shaft groove, and the third rolling shaft groove is configured to accommodate the flip shaft, the third rolling shaft seat is provided with a third mounting hole, and a first flip shaft cover plate is matched on the third mounting hole.

A length size of the rolling shaft is less than that of the flip shaft, the rolling shaft and the flip shaft are arranged in parallel, and the linkage rod is perpendicular to the rolling shaft and the flip shaft.

By moving the control lever, the first universal roller in the first moving wheel set and the second universal rollers in the second moving wheel sets can be in contact with the ground or be retracted in the mounting slot; when the first universal roller and the second universal rollers are in contact with the ground, the counterweight base is lifted and separated from the ground to realize movement; and when the first universal roller and the second universal rollers are retracted in the mounting slot, the counterweight base is in contact with the ground and is in a static state.

The control lever can be further provided with a control handle, and a lower part of the control handle is configured to mount the control lever in a fit manner.

A bottom end of the control handle is provided with a lever accommodating cavity, and the control lever is embedded inside the lever accommodating cavity.

Compared with the prior art, the present disclosure has the following beneficial effects: In the present disclosure, the moving mechanism is optimized, such that the moving mechanism can be completely embedded in the mounting slot or protruded from a bottom surface of the mounting slot by switching, and the counterweight base can be lifted to realize autonomous switching between moving and stationary states of the counterweight base; the specific structures of the control portion and the driven portion are optimized, an isosceles triangle structure is formed by the first moving wheel set and the two second moving wheel sets, and thereby a stable support point is formed; it is convenient to realize steering drive and convenience of movement is improved.

The characteristics of the present disclosure can be clearly understood by reference to the drawings and the detailed description of preferred embodiments below.

DESCRIPTION OF THE EMBODIMENTS

In order to make the technical means, creation characteristics, purposes and effects of the present disclosure easy to understand, the present disclosure will be further described below in combination with specific drawings.

Figure 1:
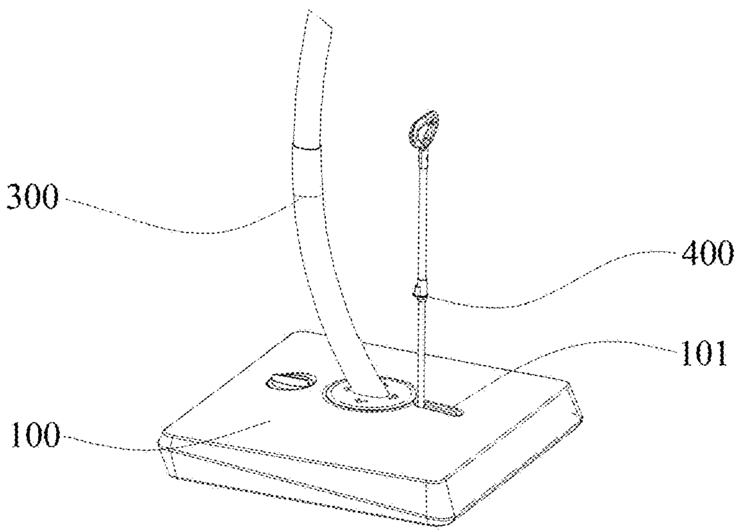
FIG. 1 is an overall structural schematic diagram 1 according to the present disclosure.
Figure 2:
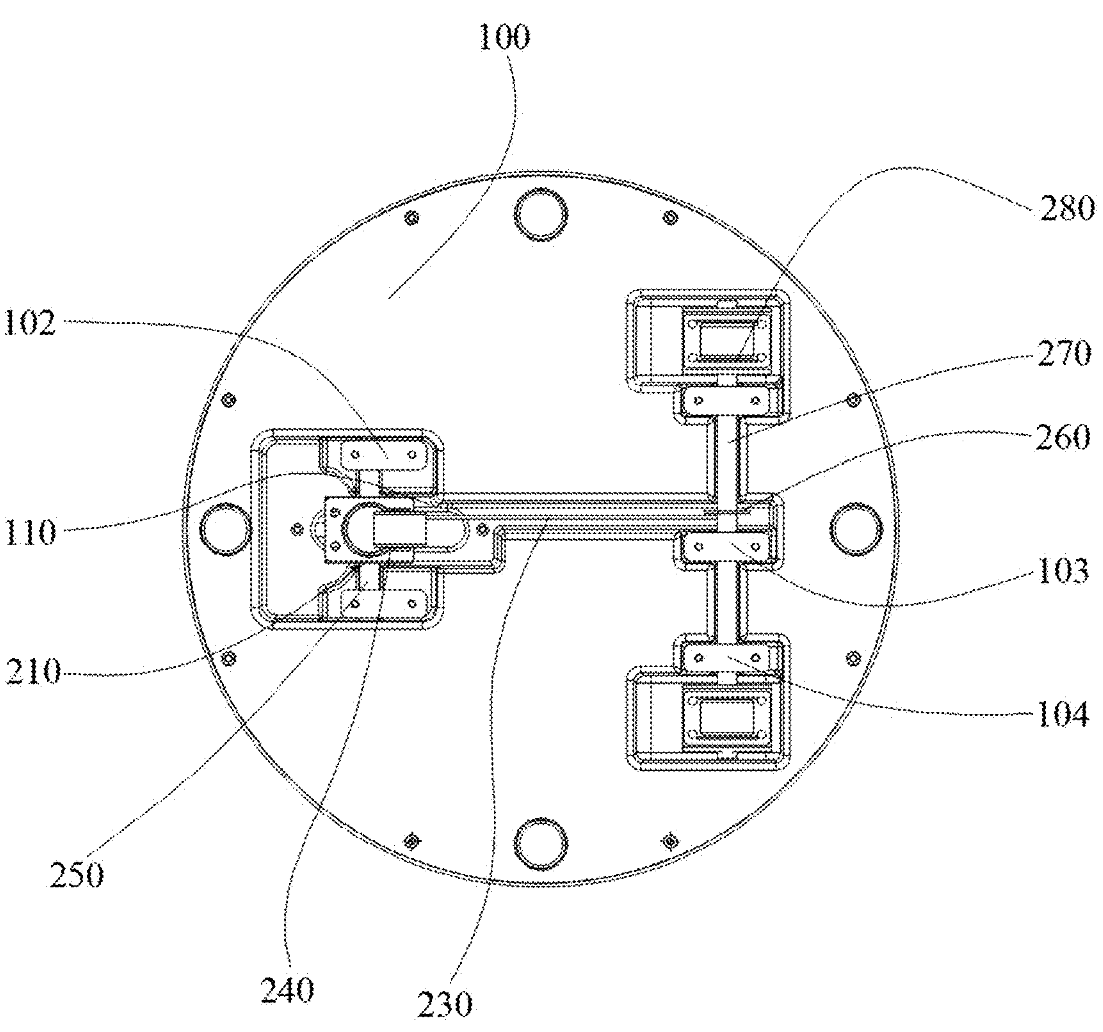
FIG. 2 is an overall structural schematic diagram 2 according to the present disclosure.
Figure 3:
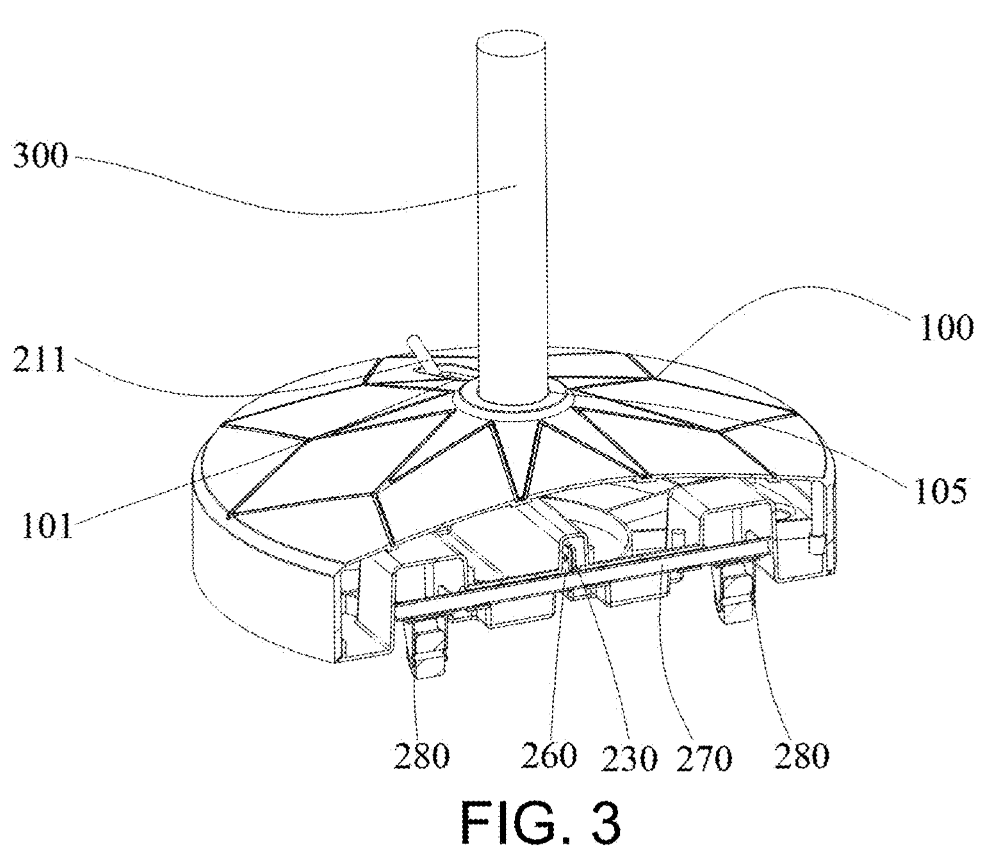
FIG. 3 is a schematic diagram of an overall sectional structure according to the present disclosure.
Figure 4:
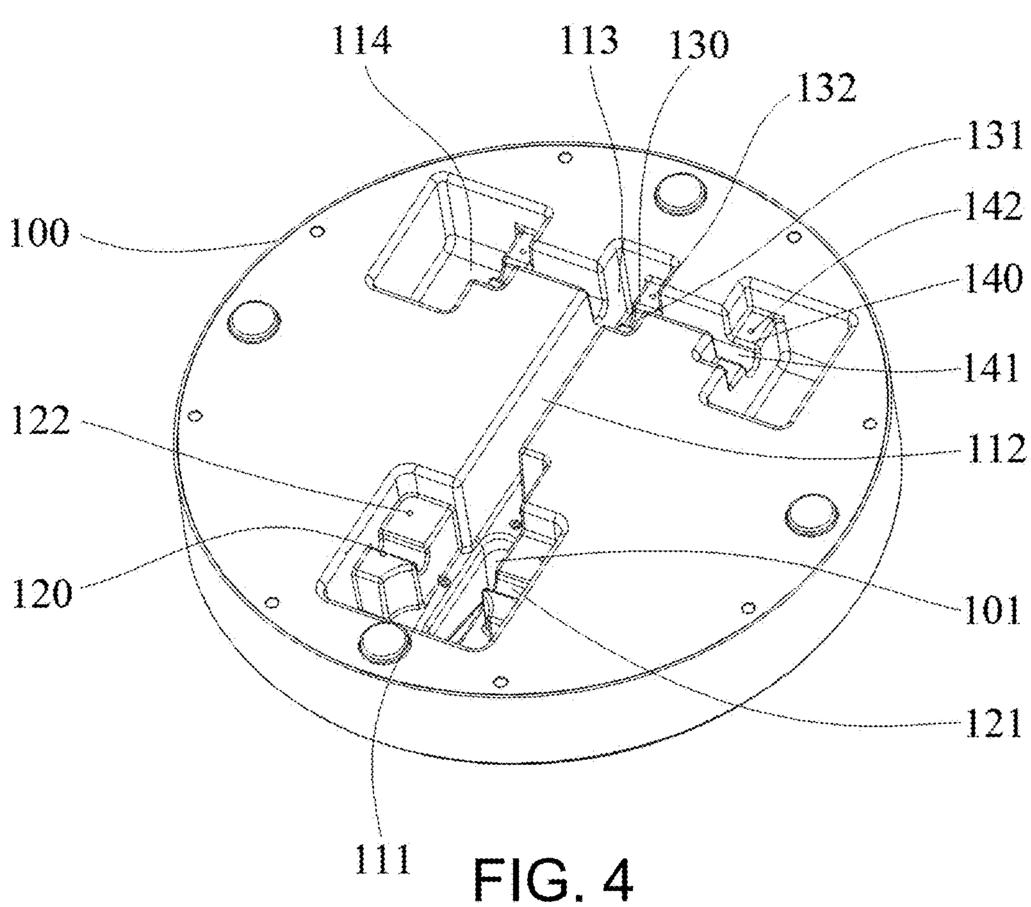
FIG. 4 is a structural schematic diagram of a counterweight base according to the present disclosure.
Figure 5:
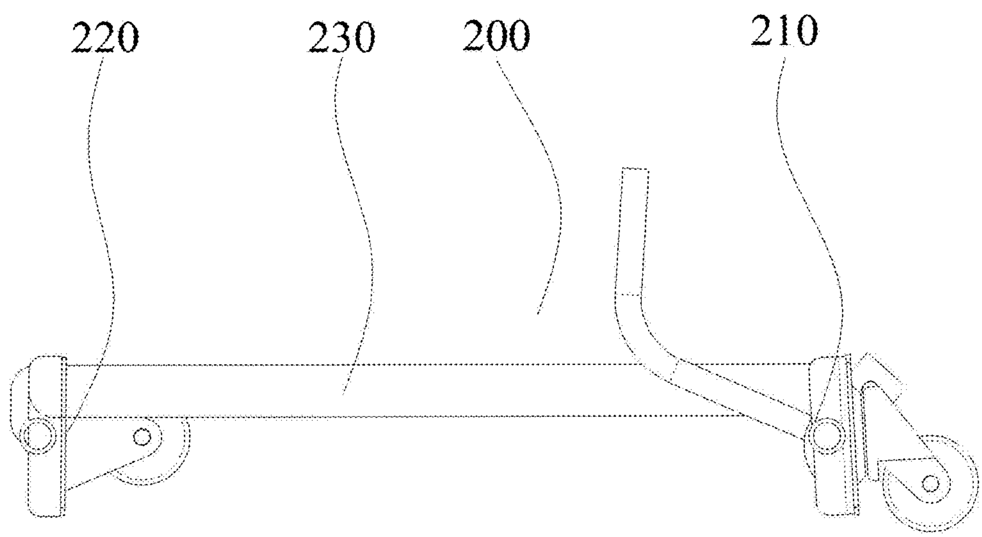
FIG. 5 is a structural schematic diagram 1 of a moving mechanism according to the present disclosure.
Figure 6:
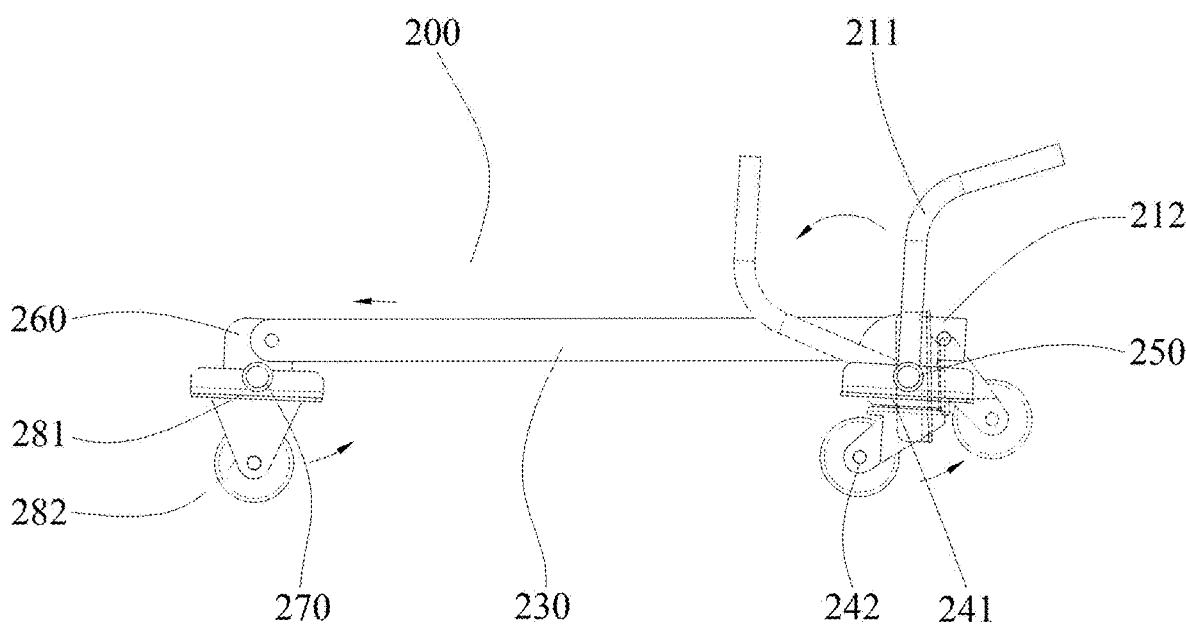
FIG. 6 is a structural schematic diagram 2 of a moving mechanism according to the present disclosure.
Figure 7:
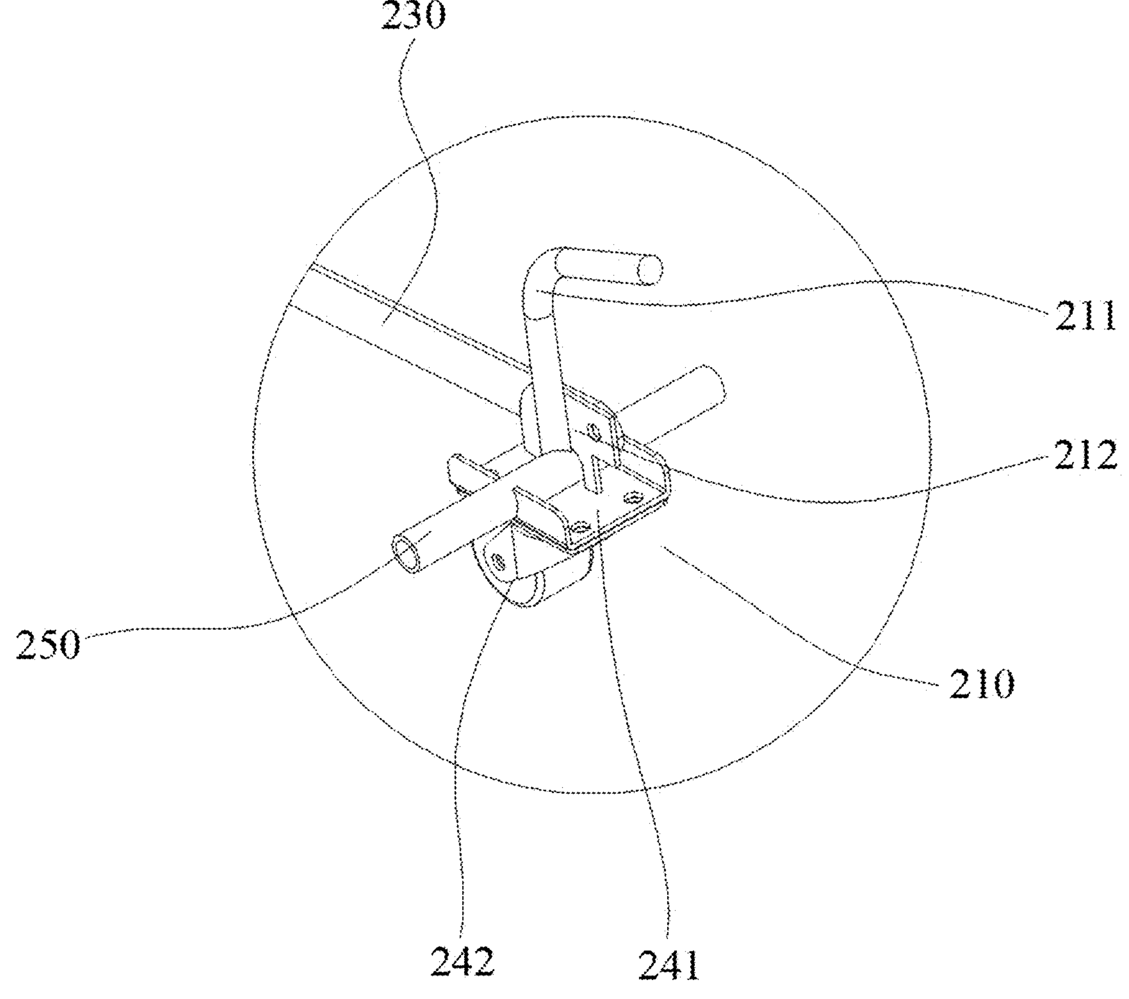
FIG. 7 is a structural schematic diagram of a control portion according to the present disclosure.

With reference to FIG. 1 to FIG. 7, a movable counterweight base assembly for an outdoor sunshade umbrella is provided, including a counterweight base 100 and a moving mechanism 200, where the moving mechanism 200 can drive the counterweight base 100 to move, a bottom of the counterweight base 100 is provided with a mounting slot 110, and the mounting slot 110 is configured to mount the moving mechanism 200 in a fit manner; the moving mechanism 200 can be completely embedded in the mounting slot 110 or protruded from a bottom surface of the mounting slot 110 by switching, such that the counterweight base 100 can be lifted, so as to realize autonomous switching between moving and stationary states of the counterweight base 100, and facilitate overall movement of an outdoor sunshade umbrella.

In the specific structure, the moving mechanism 200 includes a control portion 210 and a driven portion 220; the control portion 210 is configured to realize operation of movement, and through the control portion 210 driving the driven portion 220, it is convenient to realize a movement of the counterweight base 100, and thereby realize a movement of the sunshade umbrella; the control portion 210 includes a control lever 211, a flip arm 212 located at a lower part of the control lever 211 and a first moving wheel set 240 located at a lower part of the flip arm 212, a linkage rod 230 is connected between the control portion 210 and the driven portion 220, and the driven portion 220 includes a flip seat 260, a flip shaft 270 and second moving wheel sets 280 located at both ends of the flip shaft 270; when the control lever 211 moves, the control lever 211 can drive the flip arm 212 to flip, the flip arm 212 drives the first moving wheel set 240 to protrude downward from the mounting slot 110, the flip arm 212 drives the linkage rod 230 synchronously and further drives the flip seat 260 to flip through the linkage rod 230, the flip seat 260 drives the flip shaft 270 to rotate, and the flip shaft 270 drives the second moving wheel sets 280 to protrude downward from the mounting slot 110, such that a bottom surface of the counterweight base 100 is separated from the ground, and the first moving wheel set 240 and the second moving wheel sets 280 are in contact with the ground, thereby enabling a movement of the counterweight base 100; the specific structures of the control portion 210 and the driven portion 220 are optimized, an isosceles triangle structure is formed by the first moving wheel set 240 and the second moving wheel sets 280, and thereby a stable support point is formed; it is convenient to realize steering drive and convenience of movement is improved.

In combination with the foregoing, the counterweight base 100 is provided with a control cavity 101, the control cavity 101 is shaped like a runway hole, the control lever 211 passes through the control cavity 101 and extends upward, and the control lever 211 can be manipulated and moved along the control cavity 101; the shape of the control cavity is optimized to facilitate formation of a movement route, such that the control lever 211 can be easily reciprocated to realize driving of other parts.

In combination with the foregoing, the counterweight base 100 is provided with an umbrella post assembly cavity 105, the umbrella post assembly cavity 105 is used together with an umbrella post 300, a rotary base can also be mounted on the umbrella post assembly cavity 105 in a fit manner, and the rotary base is a base used in the existing design to realize rotation of the sunshade umbrella.

In combination with the foregoing, the counterweight base 100 is circular or polygonal, and preferably circular and square.

In the specific structure, the mounting slot 110 includes a first slot 111, a linkage shaft groove 112, a flip shaft groove 113 and two second slots 114; the first slot 111 is configured to match the first moving wheel set 240, the linkage shaft groove 112 is configured to match the linkage rod 230, the flip shaft groove 113 is configured to match the flip shaft 270, and the second slots 114 are configured to match the second moving wheel sets 280 correspondingly, so as to facilitate mounting of different parts of the moving mechanism 200; the first slot 111 is provided with two first rolling shaft seats 120, the first rolling shaft seats 120 are provided with first rolling shaft grooves 121, a rolling shaft 250 is matched in the first rolling shaft grooves 121, the rolling shaft 250 is fixedly mounted on a lower end of the control lever 211, the first rolling shaft grooves 121 is provided with first mounting holes 122, and rolling shaft limit cover plates 102 are fixed on the first mounting holes 122 to facilitate mounting of the rolling shaft 250, such that the rolling shaft 250 can be rotated relative to the first rolling shaft seats 120, the flip arm 212 is driven in combination with the control lever 211, and the first moving wheel set 240 can rotate; a rollover stability of the first moving wheel set 240 can be increased in combination with the rolling shaft 250, and overall movement is more stable.

Further, the first moving wheel set 240 includes a first roller seat 241 and a first universal roller 242 located at a lower part of the first roller seat 241, one end of the flip arm 212 is hinged with one end of the linkage rod 230, and the other end of the flip arm 212 is fixedly matched with any one or more of the control lever 211, the first roller seat 241 and the rolling shaft 250; and when the control lever 211 moves, the flip arm 212 flips with a hinge between the flip arm 212 and the linkage rod 230 as a pivot point, and both ends of the rolling shaft 250 rotate along the first rolling shaft grooves 121 respectively to realize overall rotation of the first moving wheel set 240, such that the first universal roller 242 can realize flip to be contact with the ground, and the counterweight base 100 is lifted as a whole to realize movement.

Further, the second slot 114 is provided with at least one second rolling shaft seat 140, the second rolling shaft seat 140 is provided with a second rolling shaft groove 141, the second rolling shaft groove 141 is configured to match the flip shaft 270, the second rolling shaft seat 140 is provided with second mounting holes 142, second flip shaft cover plates 104 are matched on the second mounting holes 142, and the second flip shaft cover plates 104 facilitate mounting of the flip shaft 270; each of the second moving wheel sets 280 includes a second roller seat 281 and a second universal roller 282 located at a lower part of the second roller seat 281, the second moving wheel sets 280 located at both ends and the first moving wheel set 240 are arranged in an isosceles triangle, and the first moving wheel set 240 is located at a vertex angle; the flip shaft groove 113 is provided with a third rolling shaft seat 130, the third rolling shaft seat 130 is provided with a third rolling shaft groove 131, the third rolling shaft groove 131 is configured to accommodate the flip shaft 270, the third rolling shaft seat 130 is provided with a third mounting hole 132, a first flip shaft cover plate 103 is matched on the third mounting hole 132, and the first flip shaft cover plate 103 facilitates mounting of the flip shaft 270; overall structural design is optimized, and a length size of the rolling shaft 250 is less than that of the flip shaft 270, the rolling shaft 250 and the flip shaft 270 are arranged in parallel, and the linkage rod 230 is perpendicular to the rolling shaft 250 and the flip shaft 270 to facilitate realization of forward and backward linkage.

In combination with the foregoing, by moving the control lever 211, the first universal roller 242 in the first moving wheel set 240 and the second universal rollers 282 in the second moving wheel sets 280 can be in contact with the ground or be retracted in the mounting slot 110; in specific operation, the first universal roller 242 and the second universal rollers 282 are usually embedded in the mounting slot 110, and the counterweight base 100 is in a static state and is in contact with the ground; when a user operates the control lever 211, the control lever 211 moves, and the flip arm 212 is driven to turn over; usually, a rotation angle is about 90°, and according to a specific structure and a rotation design of the flip arm 212, other rotation angle is possible; due to rotation of the flip arm 212, the fixedly matched first moving wheel set 240 rotates, and the first universal roller 242 is in contact with the ground; meanwhile, due to rollover of the flip arm 212, the linkage rod 230 is pulled, then the flip seat 260 located at the other end of the linkage rod 230 flips over and drives the flip shaft 270 to rotate synchronously, and the second moving wheel sets 280 at both ends of the flip shaft 270 rotate, such that the second universal rollers 282 can be in contact with the ground; usually the first moving wheel set 240 and the two second moving wheel sets 280 are changed from a transverse state to a longitudinal state, such that the first universal roller 242 and the second universal rollers 282 are in contact with the ground, and the counterweight base 100 is lifted and separated from the ground to realize movement; on the contrary, when the first universal roller 242 and the second universal rollers 282 are retracted in the mounting slot 110, the counterweight base 100 is in contact with the ground and is in a static state.

In combination with the above structure, the control lever 211 can be further provided with a control handle 400, and a lower part of the control handle 400 is configured to mount the control lever 211 in a fit manner; a bottom end of the control handle 400 is provided with a lever accommodating cavity, the control lever 211 is embedded inside the lever accommodating cavity, and the control handle 400 is added to facilitate a user's adjustment and movement.

In the present disclosure, the moving mechanism is optimized, such that the moving mechanism can be completely embedded in the mounting slot or protruded from a bottom surface of the mounting slot by switching, and the counterweight base can be lifted to realize autonomous switching between moving and stationary states of the counterweight base; the specific structures of the control portion and the driven portion are optimized, an isosceles triangle structure is formed by the first moving wheel set and the two second moving wheel sets, and thereby a stable support point is formed; it is convenient to realize steering drive and convenience of movement is improved.

The foregoing is only preferred embodiments of the present disclosure, rather than limiting the present disclosure in any form. Any simple modifications, equivalent changes or modifications made to the above examples based on the technical principle of the present disclosure should still fall into the scope of the technical solutions of the present disclosure.

What is claimed is:

1. A movable counterweight base assembly for an outdoor sunshade umbrella, comprising a counterweight base and a moving mechanism, wherein the moving mechanism is capable of driving the counterweight base to move, a bottom of the counterweight base is provided with a mounting slot, and the mounting slot is configured to mount the moving mechanism in a fit manner; the moving mechanism comprises a control portion and a driven portion, the control portion comprises a control lever, a flip arm located at a lower part of the control lever and a first moving wheel set located at a lower part of the flip arm, a linkage rod is connected between the control portion and the driven portion, and the driven portion comprises a flip seat, a flip shaft and second moving wheel sets located at both ends of the flip shaft; when the control lever moves, the control lever is capable of driving the flip arm to flip, the flip arm drives the first moving wheel set to protrude downward from the mounting slot, the flip arm drives the linkage rod synchronously and further drives the flip seat to flip through the linkage rod, the flip seat drives the flip shaft to rotate, and the flip shaft drives the second moving wheel sets to protrude downward from the mounting slot, such that a bottom surface of the counterweight base is separated from a ground, and the first moving wheel set and the second moving wheel sets are in contact with the ground, thereby enabling a movement of the counterweight base.

2. The movable counterweight base assembly for an outdoor sunshade umbrella according to claim 1, wherein the counterweight base is provided with a control cavity, the control lever passes through the control cavity and extends upward, and the control lever is manipulated and moved along the control cavity.

3. The movable counterweight base assembly for an outdoor sunshade umbrella according to claim 2, wherein the control cavity is shaped like a runway hole.

4. The movable counterweight base assembly for an outdoor sunshade umbrella according to claim 3, wherein the counterweight base is provided with an umbrella post assembly cavity.

5. The movable counterweight base assembly for an outdoor sunshade umbrella according to claim 4, wherein the counterweight base is circular or polygonal.

6. The movable counterweight base assembly for an outdoor sunshade umbrella according to claim 1, wherein the mounting slot comprises a first slot, a linkage shaft groove, a flip shaft groove and two second slots; the first slot is configured to match the first moving wheel set, the linkage shaft groove is configured to match the linkage rod, the flip shaft groove is configured to match the flip shaft, and the second slots are configured to match the second moving wheel sets correspondingly.

7. The movable counterweight base assembly for an outdoor sunshade umbrella according to claim 6, wherein the first slot is provided with two first rolling shaft seats, the first rolling shaft seats are provided with first rolling shaft grooves, a rolling shaft is matched in the first rolling shaft grooves, and the rolling shaft is fixedly mounted on a lower end of the control lever.

8. The movable counterweight base assembly for an outdoor sunshade umbrella according to claim 7, wherein the first rolling shaft grooves are provided with first mounting holes, and rolling shaft limit cover plates are fixed on the first mounting holes.

9. The movable counterweight base assembly for an outdoor sunshade umbrella according to claim 7, wherein the first moving wheel set comprises a first roller seat and a first universal roller located at a lower part of the first roller seat, one end of the flip arm is hinged with one end of the linkage rod, and the other end of the flip arm is fixedly matched with any one or more of the control lever, the first roller seat and the rolling shaft; and when the control lever moves, the flip arm flips with a hinge between the flip arm and the linkage rod as a pivot point, and both ends of the rolling shaft rotate along the first rolling shaft grooves respectively to realize overall rotation of the first moving wheel set.

10. The movable counterweight base assembly for an outdoor sunshade umbrella according to claim 9, wherein the second slot is provided with at least one second rolling shaft seat, the second rolling shaft seat is provided with a second rolling shaft groove, the second rolling shaft groove is configured to match the flip shaft, the second rolling shaft seat is provided with second mounting holes, and second flip shaft cover plates are matched on the second mounting holes.

11. The movable counterweight base assembly for an outdoor sunshade umbrella according to claim 10, wherein each of the second moving wheel sets comprises a second roller seat and a second universal roller located at a lower part of the second roller seat, the second moving wheel sets located at both ends and the first moving wheel set are arranged in an isosceles triangle, and the first moving wheel set is located at a vertex angle.

12. The movable counterweight base assembly for an outdoor sunshade umbrella according to claim 11, wherein the flip shaft groove is provided with a third rolling shaft seat, the third rolling shaft seat is provided with a third rolling shaft groove, the third rolling shaft groove is configured to accommodate the flip shaft, the third rolling shaft seat is provided with a third mounting hole, and a first flip shaft cover plate is matched on the third mounting hole.

13. The movable counterweight base assembly for an outdoor sunshade umbrella according to claim 11, wherein by moving the control lever, the first universal roller in the first moving wheel set and the second universal rollers in the second moving wheel sets are in contact with the ground or are retracted in the mounting slot; when the first universal roller and the second universal rollers are in contact with the ground, the counterweight base is lifted and separated from the ground to realize movement; and when the first universal roller and the second universal rollers are retracted in the mounting slot, the counterweight base is in contact with the ground and is in a static state.

14. The movable counterweight base assembly for an outdoor sunshade umbrella according to claim 13, wherein the control lever is further provided with a control handle, and a lower part of the control handle is configured to mount the control lever in a fit manner.

15. The movable counterweight base assembly for an outdoor sunshade umbrella according to claim 14, wherein a bottom end of the control handle is provided with a lever accommodating cavity, and the control lever is embedded inside the lever accommodating cavity.

16. The movable counterweight base assembly for an outdoor sunshade umbrella according to claim 7, wherein a length size of the rolling shaft is less than that of the flip shaft, the rolling shaft and the flip shaft are arranged in parallel, and the linkage rod is perpendicular to the rolling shaft and the flip shaft.

* * * * *